(12) United States Patent
Alahi et al.

(10) Patent No.: US 8,749,630 B2
(45) Date of Patent: Jun. 10, 2014

(54) METHOD AND SYSTEM FOR AUTOMATIC OBJECTS LOCALIZATION

(75) Inventors: Alexandre Alahi, Prilly (CH); Mohammad Golbabaee, Renens (CH); Pierre Vandergheynst, Ecublens (CH)

(73) Assignee: Ecole Polytechnique Federale de Lausanne (EPFL), Lausanne (CH)

( * ) Notice: Subject to any disclaimer, the term of this patent is extended or adjusted under 35 U.S.C. 154(b) by 491 days.

(21) Appl. No.: 12/779,547

(22) Filed: May 13, 2010

(65) Prior Publication Data

US 2011/0279685 A1 Nov. 17, 2011

(51) Int. Cl.
*H04N 7/18* (2006.01)

(52) U.S. Cl.
USPC .......................................... 348/143

(58) Field of Classification Search
None
See application file for complete search history.

(56) References Cited

U.S. PATENT DOCUMENTS

| | | | |
|---|---|---|---|
| 2003/0107649 A1 | 6/2003 | Flickner et al. | |
| 2005/0265582 A1* | 12/2005 | Buehler et al. | 382/103 |
| 2008/0118106 A1 | 5/2008 | Kilambi et al. | |
| 2008/0123968 A1* | 5/2008 | Nevatia et al. | 382/228 |
| 2008/0137950 A1* | 6/2008 | Park et al. | 382/168 |
| 2009/0002489 A1* | 1/2009 | Yang et al. | 348/143 |
| 2009/0034793 A1* | 2/2009 | Dong et al. | 382/103 |
| 2009/0304265 A1* | 12/2009 | Khan et al. | 382/154 |
| 2010/0067741 A1* | 3/2010 | Stolkin et al. | 382/103 |

FOREIGN PATENT DOCUMENTS

EP 2131328 A2 12/2009

OTHER PUBLICATIONS

J. Kannala and S. S. Brandt, A Generic Camera Model and Calibration Method for Conventional, Wide-Angle, and Fish-Eye Lenses, IEEE Transactions on Pattern Analysis and Machine Intelligence, 2006, vol. 28, No. 8, pp. 1-15.
F. Fleuret, J. Berclaz, R. Lengagne, and P. Fua, Multicamera People Tracking with a Probablistic Occupancy Map, IEEE Transactions on Pattern Analysis and Machine Intelligence, Feb. 2008, vol. 30, No. 2, pp. 267-282.
S. M. Khan and M. Shah, Tracking Multiple Occluding People by Localizing on Multiple Scene Planes, IEEE Transactions on Pattern Analysis and machine Intelligence, Mar. 2009, vol. 31, No. 3, pp. 505-519.
F. Porikli, Achieving Real-Time Object Detection and Tracking Under Extreme Conditions, Journal of Real-Time Image Processing, 2006, vol. 1, No. 1, pp. 33-40.
C. Stauffer and W.E.L. Grimson, Adaptive Background Mixture Models for Real-Time Tracking, IEEE International Conference on Computer Vision and Pattern Recognition, 1999, vol. 2, pp. 246-252.

(Continued)

*Primary Examiner* — Umar Cheema
(74) *Attorney, Agent, or Firm* — Blank Rome (57) ABSTRACT

A method for automatic localization of objects in a mask. The method includes building a dictionary of atoms, wherein each atom models the presence of one object at one location and iteratively determining the atom of said dictionary which is best correlated with said mask, until ending criteria are met. The invention system concerns also automatically detects objects in a mask. At least one fixed camera is provided for acquiring video frames. A computation device is used for calibrating at least one fixed camera for extracting foreground silhouettes in each acquired video frames for discretizing said ground plane into a non-regular grid of potential location points for constructing a dictionary of atoms, and, for finding objects location points with the previous method. And a propagating device is provided to propagate the result in at least one fixed camera view.

30 Claims, 5 Drawing Sheets

(56) References Cited

OTHER PUBLICATIONS

O. Tuzel, F. Porikli, and P. Meer, Human Detection via Classification on Riemannian Manifolds, IEEE Transactions on Pattern Analysis and Machine Intelligence, 2007, vol. 20, pp. 1713-1727.

N. Dalal and B. Triggs, Histograms of Oriented Gradients for Human Detection, IEEE International Conference on Computer Vision and Pattern Recognition, 2005, pp. I: 886-893.

P. Breen, "Algorithms for Sparse Approximation," Year 4 Project School od Mathematics, University of Edinburgh, 2009, pp. 1-34.

M. Golbabaee et al., "SCOOP: A Real-Time Sparsity Driven People Localization Algorithm," Aug. 29, 2011, IEEE, pp. 1-29.

H. Tao et al., "Non-Orthogonal Binary Subspace and its Applications in Computer Vision," Tenth IEE Intl Conference on Computer Vision (ICCV'05), 2005, 7 pages.

A. Alahi et al., "Sparsity-Driven People Localization Algorithm: Evaluation in Crowded Scenes Environments," IEEE, 2009, pp. 1-8.

A. Alahi et al., "Sparsity Driven People Localization with a Heterogeneous Network of Cameras," Journal of Mathematical Imaging and Vision, Jan. 27, 2011, vol. 41, pp. 39-58.

A. Alahi e tal., "Sport Players Detection and Tracking with a Mixed Network of Planar and Omnidirectional Cameras," IEEE, 2009, 8 pages.

European Search Report dated Feb. 23, 2012, cited in EP Application No. 11166041.

\* cited by examiner

PRIOR ART

METHOD AND SYSTEM FOR AUTOMATIC OBJECTS LOCALIZATION

FIELD OF THE INVENTION

The present invention concerns a method and a system for automatic localization and/or detection and/or identification and/or singulation and/or segmentation and/or computation and/or tracking of objects. More precisely, objects are automatically detected and localized on the ground and in the image planes of a network of cameras or even a single camera setup. Objects can be people in a crowded environment.

DESCRIPTION OF RELATED ART

Accurate vision-based people detection has been of interest for the past decades in many applications. A number of surveillance applications for example require the detection of people to ensure security, safety and site management. Examples include the behavior analysis and the monitoring of entry points, bus terminal and train stations in order to know for example if people stay in a forbidden area.

Another example is the safety in an urban environment: the knowledge of the pedestrians' positions can for example prevent collisions with cars. For many applications it is also useful to automatically compute pedestrians in a specific area.

People detection can be applied also to the sport game analysis: the detection of football or basketball players can be fed-back to the coach in order to improve the team play. Another possible application concerns the recognition of the numbers worn by athletes during a race.

The automatic localization of objects different to people can be used for analyzing and classifying biomedical cells in a laboratory or for computing industrial objects, cars etc. . . . . Each kind of application requiring the localization of an object with a specific shape in an environment is imaginable.

The main difficulty in automatic localization of the objects comes from the mutual occlusions of these objects in a group. For instance, in sport game such as basketball, players can strongly occlude each other and have abrupt change of behavior.

The most effective techniques in the related art for detecting moving people or objects occluding each other are highly complex and may thus require the use of costly hardware. Moreover, they may not be fast enough to perform in real-time detection and localization of people or objects within a crowd. Often they use tracking information to deal with occlusions.

EP2131328 concerns a method for automatic detection and tracking of multiple objects. The video data obtained from one or more cameras are processed in two steps: the first fast step comprises an indexing process, which generates estimate hypothesis for the location and attributes of objects. Hypothesis are then refined to generate statistical models for the objects appearance and geometry, and then applied for discriminative tracking, during which objects locations and attributes are updated by using online uncertainty estimation. Each person is tracked by a combination of two kernels, one for the head and one for the torso. When there is an occlusion and the system predicts for example that the torso of a person will be occluded by another person, the system lowers the weight of this torso kernel and reduces its influence in the tracking algorithm. The invention is fast only during the first step and requires complex computing, based on online uncertainty estimation and tracking information. Moreover estimates can be improved by using multiple cameras.

US2003/0107649 concerns a method for detecting and tracking groups of socially interrelated people at a checkout line in a store, in order to permit an additional checkout line to be opened when the number of groups in the observed check-out line exceeds a predetermined value. Groups are determined by analyzing inter-person distance over time. After, the people silhouette detection by using background subtraction and person segmentation allows distinguishing between individual persons. It is based on two kinds of informations: temporal constraints (i.e., people belonging to the same shopping group enter and exit the scene together) and global motion (i.e., people in group show similar movement patterns during checkout).

US2009/0304265 concerns a method for modeling three-dimensional object by using two-dimensional images of the object from multiple cameras. The surface of the object is computed from estimate slices of the object that lie in parallel planes and cutting through the object. The greater the number of views, i.e. the number of cameras, the more accurate the reconstruction of the object is. The greater the number of parallel plans, the more robust the method is. This method does not work by using a single camera with fixed orientation. Such an approach is computationally intensive.

US2009/0002489 concerns a method for object tracking. For each of a plurality of human objects, a person's model comprising at least one feature of the person, e.g. a color feature, is created and dynamically updated. An occlusion disambiguation algorithm is performed by using the image of a blob, based on the previous tracks and the person's model. More precisely, a person's model is selected from the set of models and each selected person's model is matched to the blob and scored. The model with the best score is then removed from the list of the models, according to a greedy algorithm. This invention enables to track efficiently objects through occlusions because it uses informations from previous tracks, but does not permit localization of the objects without temporal informations.

US2008/0123968 concerns a human detection and tracking system including a full body detector and a plurality of part detectors, each for a specific part of the human body (for example head, torso and legs). A combiner detector combines the detectors' responses and generates a combined detection response. It is further configured to model inter-occlusions of the humans in the image, and to implement a greedy matching algorithm to perform the match between the detectors' responses and the body parts of humans. The human detection problem is formulated as a maximum a priori estimation problem. This invention requires at least four detectors. Moreover, the part detectors have to be learned.

US2009/0034793 concerns a method for performing crowd segmentation by using an indexing step, which produces a quick approximate result followed, when desired, by an estimation step that further refines the approximate result. During the indexing step, the foreground silhouette shape is matched with a set of foreground silhouettes shapes, for each of which the number and the position of human subjects is known. During the estimation step a MCMC (Markov Chain Monte Carlo) is used. The method requires the construction of a look-up table containing the set of foreground silhouettes shapes and its relative number and position of the human subjects forming each shape. Moreover, the higher the accuracy of representation of the foreground silhouette shape to be matched, the more complex the calculations are.

US2008/0118106 concerns a method and a system for crowd counting and monitoring. The invention uses a global description of a group of people, and rather than looking for individual, it uses the area of the entire group as the cue to estimate the number of people. The effect of occluded members is mitigate by treating the crowd as a whole group for each frame in an image sequence, and by maintaining a history of the estimates for each blob throughout the lifetime of the blob so that the most occurred value is chosen at any given frame.

Isolated people, in an un-cluttered scene, can be detected with a single static or moving camera, based on pattern recognition techniques. A set of features can be extracted from a large number of training samples to train a classifier. Dalai and B. Triggs, *"Histograms of oriented gradients for human detection,"* in *Proc. IEEE Int'l Conference on Computer Vision and Pattern Recognition*, 2005, pp. I: 886-893, used histogram of the oriented gradient as the set of features and O. Tuzel, F. Porikli, and P. Meer, *"Human detection via classification on riemannian manifolds," IEEE Trans. on Pattern Analysis and Machine Intelligence*, vol. 20, pp. 1713-1727, 2008, uses covariance matrices as the set of features together with a boosting approach.

Given a fixed camera, a moving object can also be detected by modeling the background; tracking then becomes simply an object correspondence across the frames. Typically, the work of Stauffer and Grimson, *"Adaptive background mixture models for real-time tracking," Proc. IEEE Int'l Conference on Computer Vision and Pattern Recognition*, vol. 2, pp. 246-252, 1999, can be used to extract the foreground pixels. Each pixel is modeled as a mixture of Gaussians with an on-line approximation for the update. Then, detected people can be tracked using standard approaches. Porikli, *"Achieving real-time object detection and tracking under extreme conditions," Journal of Real-Time Image Processing*, vol. 1, no. 1, pp. 33-40, 2006, presents a survey on object detection and tracking methods given a single fixed camera.

Current approaches fail to robustly isolate different persons in the image of a group of people taken by one camera due to their mutual occlusions.

In order to deal with a dense spatial distribution of people, and their mutual occlusions, the outputs of several cameras could be used to detect the objects of interest. However, current multi-view approaches do not robustly segment a crowd of people. S. M. Khan and M. Shah, *"Tracking multiple occluding people by localizing on multiple scene planes," IEEE Trans. On Pattern Analysis and Machine Intelligence*, vol. 31, no. 3, pp. 505-519, 2009, wraps the foreground silhouettes of all the camera views into a common reference and segment the feet region of people.

F. Fleuret, J. Berclaz, R. Lengagne, and P. Fua, *"Multicamera people tracking with a probabilistic occupancy map," IEEE Trans. on Pattern Analysis and Machine Intelligence*, vol. 30, no. 2, pp. 267-282, 2008, take advantage of a multi-view infrastructure to accurately track people across camera given foreground silhouettes. A mathematical framework is developed for estimating the probabilities of occupancy of a ground plane given the foreground silhouettes. The occupancy probabilities are approximates as the marginals of a product law minimizing the Kullback-Leibler divergence from the true conditional posterior distribution (referred to as Fixed Point Probability Field algorithm). This mathematical framework leads to potentially high false positives rate. In addition, the computation cost of the algorithm depends on the number of ground plane points to be evaluated, which limits the area to be monitored. Moreover, this algorithm does not work in real-time.

According to the state of art, a real-time method for localizing and/or detecting and/or identifying and/or segmenting and/or computing and/or tracking objects, robust to noise, to the possible occlusions and to abrupt changes is needed. In addition, to avoid buffering delay, a method that does not require tracking information to deal with occlusions is preferably needed. A method which allows a single frame localization is also needed.

According to the state of art, a simple, fast and low cost method for detecting/localizing the objects, which does not impose any constraint on the scene surface to be monitored is needed.

BRIEF SUMMARY OF THE INVENTION

The aim of the present invention is to provide a method and a system for automatic localization of objects that is exempted from the limitations of the prior art.

One object of the present invention is to provide a method and a system for detecting/localizing objects, robust to noise, to possible occlusions of objects and to abrupt changes of the scene.

Another object of the present invention is to provide a real-time method for detecting objects, which quickly identifies the objects' locations in presence of noise and the mutual occlusions.

Another object of the present invention is to provide a method and a system for object detection/localization, versatile with respect to the shape of the objects to be detected/localized.

Another object of the present invention is to provide a method and a system which does not impose any constraint on the scene surface to be monitored.

Another object of the present invention is to provide a method and a system for detecting/localizing objects, which is robust even when objects have similar appearance.

Another object of the present invention is to provide a method and a system which does not require large memory storage.

Another object of the present invention is to provide a method and a system for detecting objects, which is scalable to any number of the monitoring cameras including a single camera setup.

Another object of the present invention is to provide a method and a system for detecting objects that is generic to any scene of objects and sensing modality.

Another object of the present invention is to provide a method and a system for detecting objects versatile with respect to heterogeneous camera network, i.e. able to merge specific camera geometries such as planar and omnidirectional cameras, and to handle cameras with and/or without overlapping field-of-views.

According to the invention, these aims are achieved by means of method for automatic localization of objects according to claims 1 and 38, by a computer-program product for signal processing according to claim 41 and by a system for automatically detecting objects on the ground plane and in the image plane of at least one fixed camera according to claim 42.

According to one aspect, the method is based on a priori assumption that in many practical images objects are sparse. By introducing this sparsity constraint, a new and fast greedy algorithm can be developed for fast localization, detection, identification, singulation, segmentation, computation and tracking of objects. A greedy algorithm is an approximation algorithm for optimization problems, which works iteratively. At each iteration, it locally optimizes the objective function of the problem, with the hope of finding the global optimum.

The advantages of the greedy algorithm, comparing with the prior art, include in particular the possibility of reducing the time required for localizing objects. In one embodiment, objects can be localized on the ground plane and in the image plane of at least one camera. Moreover, this method allows a robust localization of these objects in presence of noise and mutual occlusions.

Advantageously, the method according to the invention is versatile with respect to the shape of the objects to be localized. It does not impose any constraint on the scene surface to be monitored.

Advantageously the method for detecting/localizing objects according to the invention is simple, fast and robust to objects with similar appearance and to abrupt changes.

In one possible embodiment, the method at each new frame takes into account localizations of objects detected and localized in previous frames (objects traking).

Advantageously the system for detecting objects according to the invention is scalable to any number of used cameras, including a single camera setup, and versatile with respect to heterogeneous camera network. It does not require large memory storage.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
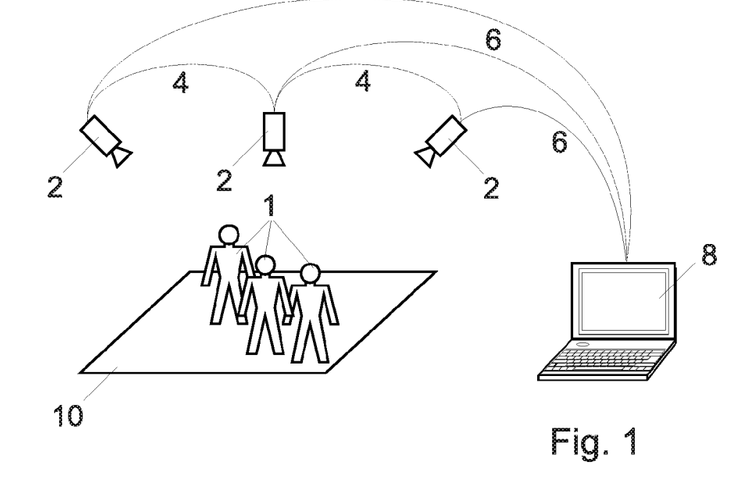
FIG. 1 shows a view of one embodiment of a system for detecting people according to the invention, comprising three cameras and one image processing system.

FIG. 1 illustrates one embodiment of a system for detecting/localizing objects according to the invention. It comprises at least one or several cameras 2. The camera may be either analog or digital. If an analog device is used, the image is digitalized with means known by the man skilled in the art. The camera 2 can be planar and/or omnidirectional. In one embodiment IR cameras can be used. The cameras 2 can have overlapping field-of-views. Moving camera can also be used instead or in addition to static camera.

In the example of FIG. 1, there are three static cameras 2. When at least two cameras are used, they are pseudo-synchronized, in order to acquire quasi simultaneously images. In this application with the expression "cameras pseudo-synchronized" it is intended cameras that acquire images that are not precisely simultaneous but that can be considered as simultaneous, i.e. having a few frame delay, a few ms of difference.

Cameras 2 are connected to an image processing system 8 via a link 6. Link 6 may be any image-transferring capable link known in the art, such as a video cable or a wireless transmission link. One end of the link 6 is connected to each camera 2, while the other end is connected to the image processing system 8. The image processing system 8 may be any type of system or device capable of executing an algorithm for interpreting the images taken by cameras 2. For example the image processing system 8 can be a PC, a laptop or a processing chip integrated into an instrument panel or the like, with suitable image processing software. The image processing system 8 can be connected to peripheral equipments such as recording devices, external communication links and power sources.

First the system is calibrated off-line by standard techniques. As an example, the camera model proposed by J. Kannala and S. S. Brandt, "*A generic camera model and calibration method for conventional, wide-angle, and fisheye lenses,*" *IEEE transactions on pattern analysis and machine intelligence*, vol. 28, no. 8, pp. 1335, 2006, can be used to map 3D points in the scene to the image plane 20 of all cameras 2.

On the ground plane 10 there are one or more objects 1. In one embodiment these objects are moving people. In another embodiment objects constitute a dense set of people, for example basketball players. Players can strongly occlude each other or have abrupt changes of behavior.

The number of objects, such as people, present in the scene is sparse because for example it is limited by the capacity of the room or of the play area.

Figure 2:
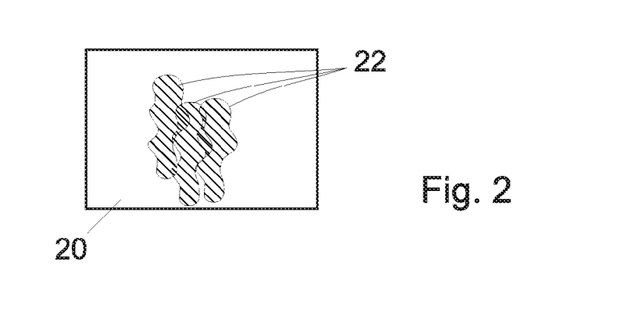
FIG. 2 shows an image plane of a camera and three foreground silhouettes.
Figure 3:
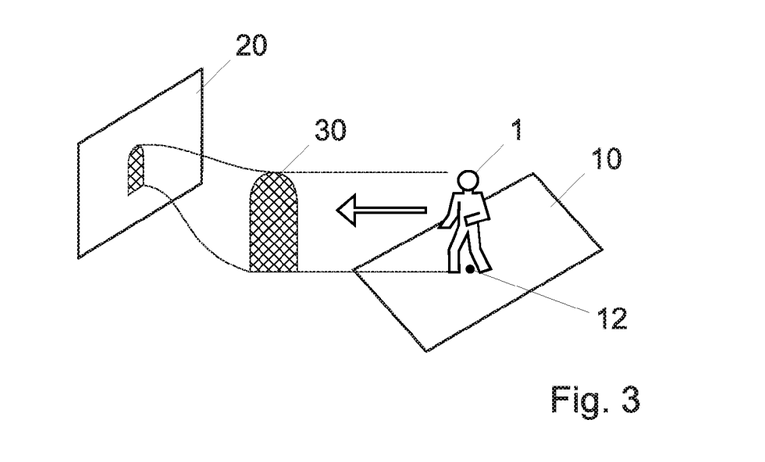
FIG. 3 shows the approximate correspondence between each point of the ground and a silhouette modeling the presence of an object, here a person, in a camera view.
Figure 4:
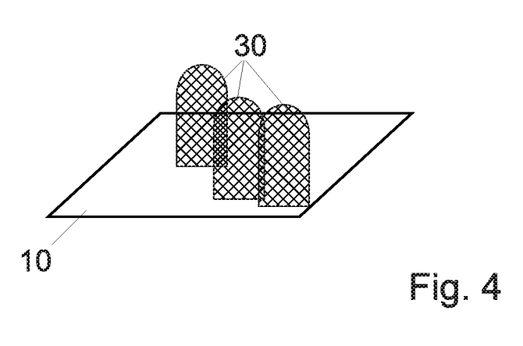
FIG. 4 shows three atoms modeling the foreground silhouettes of FIG. 2.
Figure 5:
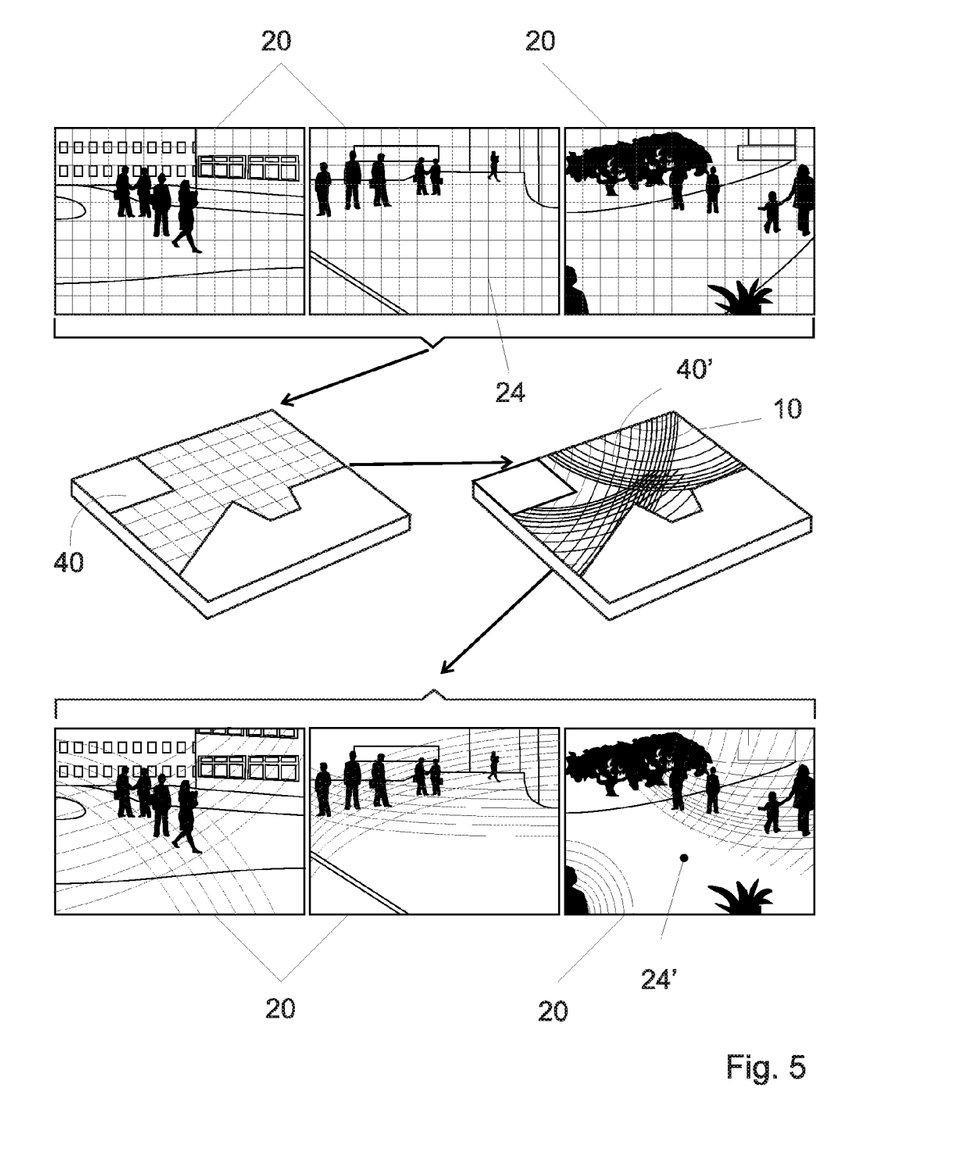
FIG. 5 is an overview of the adaptive sampling process.

The camera or cameras 2 acquire stills or video images, and foreground silhouettes 22 are extracted from those images, as shown in FIG. 2. The extraction process thus produces masks, in which extracted foreground features are represented by a non-zero value while background pixels are represented by zeros, or by any other binary values. In one embodiment multi-valued masks can be used, where the value correspond for example to a probability of having a foreground feature, or to a color or brightness of the feature. In another embodiment the extraction process produces binary masks. Up to the selection of an appropriate background subtracting method, at a given time, each camera 2, in the set of C calibrated cameras—where C is an integer positive number and it can be equal to one—is the source of one mask, for example a binary mask $y_c \in \{0,1\}^{M_c}$, where $M_c$ is the number of pixels, i.e. the resolution, of each camera indexed by $1 \leq c \leq C$. The 2-D silhouette image of each camera can be represented in a 1-D vector $y_c$, by the concatenation of its columns. Further all these vectors $y_c$ are stacked into the Multi-Silhouette Vector (MSV) y given by $$y = (Y_1^T, \ldots, Y_c^T)^T \in \{0,1\}^M$$

where, $$M = \sum_{i=1}^{C} M_i.$$

To simplify notations, the invention often refers to 2-D objects or images as 1-D vectors, i.e. the vectors obtained for instance by the concatenation of the columns of these 2-D objects respectively images.

The background/foreground extraction may be performed by applying any appropriate algorithm known by the man skilled in the art to the video frames.

In practice, the extracted foreground silhouettes 22 suffer from two flaws. First, a single silhouette in the binary mask can correspond to several people or objects close to each other. Second, silhouettes are usually made of many false positives pixels (e.g. shadows, reflections) and false negatives ones (i.e. missing foreground pixels). For example the shape of the silhouettes 22 shown in FIG. 2 can correspond to one person or two or three people.

The continuous ground plane is discretized into 2-D grid comprising sample points, for example and preferably into a non-regular or uneven grid of N sub-regions (cells). It is assumed that each cell can be occupied by only one object at each time instance. Therefore, the whole image can be represented by a binary vector x of N elements. The grid is bi-dimensional but it is represented by a vector, to simplify the notations. The elements of vector $x \in \{0,1\}^N$ are indicating the presence of objects in the corresponding cells. For example, an object is present in a cell identified by the index i if and only if $x_i=1$. This vector is called the "occupancy vector".

In one embodiment, an adaptive discretization of the ground is used in order to reduce the search space. As will be described, instead of sampling the ground by a uniform regularly spaced grid, a non-regular sampling process is used. It is adaptively built as a function of the cameras' topology and of the scene activity.

An average object or person 1 with a given volume, located in a part of the scene refers to an occupancy vector x, with only one non-zero element depending on its location. If x contains one non-zero component, each of the cameras 2 will capture only one silhouette 22, i.e. a connected area of non-zero pixels in the image plane, with size and location related to the particular projective geometry, combining the scene and the cameras. The occupancy vector x can also contain more than one non-zero element, The following "forward model" describes the underlying correspondence between each occupancy vector and its resulting multi-silhouette vector MSV. It maps the occupancy vector $x \in \{0,1\}^N$ to a certain configuration of occluding silhouettes in the camera images, by using a matrix $D \in \{0,1\}^{M \times N}$, called the "dictionary". The dictionary is composed of N columns (atoms) 30, each of them represents an approximation for the silhouette of an average-size object or person, at a possible location on the image or ground surface. By such a construction, the dictionary relates the non-empty locations of the occupancy vector x (positions occupied by objects) to an approximation of the multiple silhouettes y viewed by the cameras 2, through a nonlinear mapping.

In other words, each atom 30 approximates the silhouette 22 generated by a single object or person 1, at a given location 12, in all the camera views 20. For example, if a camera's view comprises w×h pixels, a single object or a person 1 corresponds to a vector with w×h binary elements, i.e. each element takes zero or a nonzero value, depending on the shape of the object/person and its position on the scene. In one embodiment this vector comprises zeros and ones. This vector represents a column of the dictionary D. For each ground position, i.e. for each sample point, given a camera 2, a column of the dictionary D is formed. In the case of more than one camera 2, the columns corresponding to the other cameras' view are concatenated vertically under the previous columns. The columns of D, i.e. the atoms, live thus in the same space as the observed Multi-Silhouette Vector (MSV), i.e. in a space of M dimensions.

Each column (atom) of D, say $d_i$, indicates the corresponding approximated ideal MSV of an average object or person, at position i in the scene. Practically, each of the atoms $d_i$ are generated by a computing process, thanks to the homographies mapping points in the 3-D scene to their 2-D coordinates in the camera views during the calibration step. The generation of each atom depends on the position, the zoom, the focus and the resolution of at least one camera 2.

As discussed, the dictionary $D \in \{0,1\}^{M \times N}$ is a matrix, wherein the number of rows M corresponds to the resolution of the cameras 2. In one embodiment each atom represents only one possible shape per object; in this case the number of columns N of the dictionary D corresponds to the number of sampling points of the scene. In another embodiment, more than one atom represents an object/person at each location, depending on its possible different shapes: for example, one atom for a standing person and another for a sitting person, at a certain location. In this case, the number of columns N of the dictionary D corresponds to the number of the ground sampling points multiplied by the number of possible objects'/persons' shapes.

The foreground silhouette 22 of an object or a person 1 is approximated by an atom with simple shapes. For example, in the case of a standing person, a rectangular or an elliptical shape can be used. To cope with the various poses and shapes that a person can generate in a camera view, a half-cylinder-half-spherical shape can be used to approximate the silhouette 22 of a standing person 1 in the views 20.

Mathematically, the "forward model" relates the Multi-Silhouette Vector y to the occupancy vector x and to the dictionary D (made of atoms representing single objects' approximated ideal multi-view silhouettes), by the formula $$y = D \cdot x \oplus z \qquad (1)$$

where $z \in \{0,1\}^M$ is the noise vector that corrupts MSV by both missing and extra foreground pixels. This may occur due to several reasons, e.g. non ideal silhouette extraction, non ideal modeling of the dictionary atoms, shadows, reflections, etc.

The operations in equation (1) are Boolean, i.e. the matrix multiplication in D·x differs from the conventions in linear algebra by substituting the sum and the product of the matrices elements by nonlinear Boolean operators OR and AND, respectively. The symbol $\oplus$ denotes bitwise XOR operation between two Boolean vectors. The formula (1) demonstrates a nonlinear mapping between x and y.

Instead of using Boolean operators, an alternative way of formulating the forward model can be achieved by applying a quantization operator $Q: R^N \to \{0,1\}^N$ on the conventional linear algebra's matrix multiplication D×x, where $(Q[v])_i=1$ if $v_i \neq 0$ and 0 else.

The dictionary D can also be considered as the concatenation of all the sub-dictionaries $D_c \in \{0,1\}^{M_c \times N}$, where D is the index restriction of the atoms of D to the pixel range of each camera c, for $1 \leq c \leq C$. Therefore $$D = (D_1^T, \ldots, D_c^T)^T$$

meaning implicitly that there is no theoretical constraint on the number or on the type of camera used, e.g. planar or omnidirectional.

Practically, the atoms of each $D_c$ are generated thanks to
(i) the homographies mapping points in the 3-D scene to their 2-D coordinates in the planar view during the calibration step
(ii) the approximation of the silhouettes by simple shapes (e.g. rectangular or elliptical shapes).

Advantageously a dictionary D can be modified depending on the shape of the objects or people to be detected. In one embodiment it is contained in a file, like a XML file, a txt file, a binary file or other appropriated format file, stored in the image processing system 8, and for example it can be changed/modified in order to fit better with silhouettes of Japanese or American people. Atoms of a dictionary that models the shape of a cellule or an industrial object or a car can be advantageously used for automatically localizing cellules or industrial objects or cars, respectively.

Given the constructed dictionary D and the foreground silhouettes y, the problem of detecting/localizing people in a scene can be formulated by one of the three following minimizations, depending on their respective prior side information:

(i) When the number of objects is a priori known or bounded, i.e. $W_H(x) \leq k$ where k is an integer and positive number:

$$\hat{x} = \operatorname*{argmin}_{x}(W_H(y \oplus D \cdot x)) \text{ s.t. } W_H(x) \leq k \quad (2)$$

(ii) When the maximum power of noise is bounded, i.e. $W_H(x) \leq \epsilon$ which means noise has flipped at most $\epsilon$ bits of the original MSV, where $\epsilon$ is an integer and positive number:

$$\hat{x} = \operatorname*{argmin}_{x}(W_H(x)) \text{ s.t. } W_H(y \oplus D \cdot x) \leq \varepsilon \quad (3)$$

(iii) When there is neither a prior knowledge about the noise level nor on the number of the objects $$\hat{x} = \operatorname*{argmin}_{x}(\alpha W_H(x) + W_H(y \oplus D \cdot x)) \quad (4)$$

In optimization (4) $\alpha$ is a regularization factor. In the formulas (2), (3) and (4) $W_H(a)$ denotes the Hamming weight of a Boolean vector a, i.e. the number of the nonzero elements of a. All the three minimizations above indicate recovering a sparse occupancy vector x that results in a close approximation for a given MSV y.

Minimizations (2), (3) and (4) are formulations for non-linear inverse problems with sparsity constraint, i.e. the constraint of minimizing $W_H(x)$, which is the number of non-zero elements of the occupancy vector x. In fact, the number of the objects 1 present in the scene is sparse, since, for example, it is limited to the capacity of the room or of the play area.

To solve minimizations (2), (3) and (4) a greedy approach is preferably used that is called "Regularized Matching Pursuit (R-MP)". As discussed, a greedy algorithm is an approximation algorithm for optimization problems, which works iteratively. At each iteration, it locally optimizes the objective function of the problem, with the hope of finding the global optimum. Regularized Matching Pursuit (R-MP) has three versions that are slightly different, in order to approximate respectively the solutions of the so described three optimizations (2), (3) and (4). All three versions of R-MP perform in polynomial-time and in a localization application they approximate the solution in real-time.

In all the following R-MP versions
the symbol $\wedge$ denotes bitwise AND operator
the symbol $\vee$ denotes bitwise OR operator
the symbol $\neg$ denotes bitwise NOT operator
the symbol $\oplus$ denotes bitwise XOR operator The following version of R-MP approximates the optimization (2), i.e. the case wherein there is a priori knowledge or an upperbound on the number of the objects/people in the scene.

```
Inputs:
    The MSV vector y
    An upperbound on the number of the objects/people, i.e.
    W_H (x) ≤ k
    The regularization factor λ
    The dictionary D
Outputs:
    The support set Λ̂, hence the occupancy vector x
Program:
Initiation:
    Λ̂ { }, U = { }, R ⇐ y, ŷ ⇐ 0, e ⇐ W_H (y), t ⇐ 1
Preprocess:
    for (i = 1:N) do
        if (W_H (d_i ∧ y) > 0)
            U ⇐ U ∪ {d_i}
        end if
    end for
Main Greedy Process:
    while (t ≤ k) do
```

$$j \Leftarrow \operatorname*{arg\,max}_{j' \in U} \left\{ \lambda \frac{W_H(d_{j'} \wedge R)}{W_H(d_{j'})} + (1-\lambda) \frac{W_H(d_{j'} \wedge R)}{W_H(R)} \right\}$$

```
    Updates:
        Recovered support:    Λ̂ ⇐ Λ̂ ∪ {j}
        Recovered MSV:        ŷ ⇐ ŷ ∨ d_j
        Remainder:            R ⇐ R ∧ (¬ŷ)
        Error:                e ⇐ W_H (ŷ ⊕ y)
        Counter:              t ⇐ t + 1
    end while
```

The following version of R-MP approximates the optimization (3), i.e. the case wherein there is a priori knowledge on the noise level, i.e. $W_H(x) \leq \epsilon$. In case of a probabilistic noise, $\epsilon$ is set to be the maximum noise level with very high probability.

```
Inputs:
    The MSV vector y
    An upperbound on the noise level, i.e. W_H (x) ≤ ε
Program:
Initiation:
    Λ̂ = { }, U = { }, R ⇐ y, ŷ ⇐ 0, e ⇐ W_H (y), t ⇐ 1
Preprocess:
    for (i = 1:N) do
        if (W_H (d_i ∧ y) > 0) AND (W_H (d_i ∧ ¬(y)) ≤ ε)
            U ⇐ U ∪ {d_i}
        end if
    end for
Main Greedy Process:
    while (e > ε) do
```

$$j \Leftarrow \operatorname*{arg\,max}_{j' \in U} \left\{ \lambda \frac{W_H(d_{j'} \wedge R)}{W_H(d_{j'})} + (1-\lambda) \frac{W_H(d_{j'} \wedge R)}{W_H(R)} \right\}$$

```
    Updates:
        Recovered support:    Λ̂ ⇐ Λ̂ ∪ {j}
        Recovered MSV:        ŷ ⇐ ŷ ∨ d_j
        Remainder:            R ⇐ R ∧ (¬ŷ)
        Error:                e ⇐ W_H (ŷ ⊕ y)
        Counter:              t ⇐ t + 1
    end while
```

The following version of R-MP approximates the optimization (4) with a regularization parameter $\alpha$, in the case wherein there is neither a prior information on the noise level, nor on the number of the objects/people on the scene.

```
Inputs:
    The MSV vector y
    The regularization parameter α
```

-continued

```
The regularization factor λ
The dictionary D
Outputs:
The support set Λ̂, hence the occupancy vector x
Program:
Initiation:
Λ̂ = { }, U = { }, R ⇐ y, ŷ ⇐ 0, e ⇐ W_H(y), e_p ⇐ W_H(y) + α,
t ⇐ 1
Preprocess:
    for (i = 1:N) do
        if (W_H(d_i ∧ y) > 0)
            U ⇐ U ∪ {d_i}
        end if
    end for
Main Greedy Process:
    while (e_p − e ≥ α) do
```

$$j \Leftarrow \arg\max_{j' \in U} \left\{ \lambda \frac{W_H(d_{j'} \wedge R)}{W_H(d_{j'})} + (1-\lambda) \frac{W_H(d_{j'} \wedge R)}{W_H(R)} \right\}$$

```
    Updates:
    Recovered support :      Λ̂ ⇐ Λ̂ ∪ {j}
    Recovered MSV:           ŷ ⇐ ŷ ∨ d_j
    Remainder :              R ⇐ R ∧ (¬ŷ)
    Errors :                 e_p ⇐ e
                             e ⇐ W_H(ŷ ⊕ y)
    Counter :                t ⇐ t + 1
end while
```

All the three versions of R-MP take MSV y, the Dictionary D and a regularization parameter λ, as the inputs. The shape used to generate the atoms then does not affect the computation complexity since the dictionary D is computed "off-line", i.e. once before the detection process. Moreover, each version of R-MP, depending on the corresponding optimization problem that it tends to solve, takes especial a priori side information. For example, the version related to the formula (2) takes a priori known upper-bound k on the number of the objects/people in the scene. Whereas the version related to the formula (3) asks for ε an upperbound on the noise level, and finally the version related to the formula (4) takes an extra regularization parameter α to weight appropriately two terms of the optimization (4).

All the three versions of R-MP (based on their respective inputs) estimate the support set $\hat{\Lambda} \subseteq \{1, 2, \ldots, N\}$, which determines the positions of the nonzero elements (positions of ones in Boolean case) of the recovered occupancy vector $\hat{x}$. Since occupancy vector is Boolean, it can be perfectly characterized by its support set.

All the three versions of R-MP contain a "Preprocessing" step that reduces the search space of the "Main Greedy Process" to a set $U \subset \{1, 2, \ldots, N\}$. Hence, the major complexity of the algorithm that belongs to the iterative part (Main Greedy Process) scales with the cardinality of U, rather than N. The Preprocessing step for the first (formula (2)) and the third (formula (4)) version of the R-MP is the same, and it means reducing the search space U to the atoms of the dictionary whose support set (positions of the nonzero bits) have at least one element in common with the support of MSV y. For the second version (formula (3)) of the R-MP, since R-MP knows the upperbound on the noise corruptions, the search space U contains atoms of D whose support set have at least one element in common with the support of MSV y, but no more than ε elements out of the support of MSV.

All three versions of R-MP contain an iterative step "Main Greedy Process". At each iteration, R-MP selects an atom $d_i$ of the dictionary based on a selection criterion and adds its corresponding index i to the recovered support set $\hat{\Lambda}$. The algorithm repeats the iterations until meet stopping or ending criteria. At each iteration, the algorithm updates many parameter including the recovered support set $\hat{\Lambda}$.

The selection criteria in all three cases are set to be: the atom d, which is the maximizer of the following statistics:

$$f_{j'} = \lambda \frac{W_H(d_{j'} \wedge R)}{W_H(d_{j'})} + (1-\lambda) \frac{W_H(d_{j'} \wedge R)}{W_H(R)} \quad \forall j' \in U \quad (5)$$

The complexity of the maximization at each iteration reduces from N to the cardinality of U, thanks to the Preprocessing step.

Regarding people detection on the ground, the selection criteria in all three cases is set to select an atom maximizing the formula (5) and that has a minimum distance with previous selected atoms, typically 60-70 cm.

Each statistic $f_{j'}$ of formula (5) contains two normalized terms:

a. Cover: $\frac{W_H(d_{j'} \wedge R)}{W_H(R)}$ b. Fitness: $\frac{W_H(d_{j'} \wedge R)}{W_H(d_{j'})}$.

The cover measures how much an atom intersects with the remainder and the fitness measures how much an atom fits to the remainder. The remainder is a Boolean vector initially equivalent to the MSV y. The regularization parameter λ is used to weight appropriately between these two terms.

In one embodiment of R-MP, the selection criteria in all three realizations change to be the maximizer of a statistic wherein the cover is:

$$\frac{W_H(d_{j'} \wedge y)}{W_H(d_{j'})} \quad \forall j' \in U \quad (6)$$

The use of the MSV y instead of the remainder R on the numerator of the cover relaxes the formulation such that it allows detecting highly overlapping objects.

In another embodiment of R-MP, the selection criteria in all three realizations change to be the maximizer of a statistic wherein the cover is $$\frac{W_H(d_{j'} \wedge (R \vee \hat{y}))}{W_H(d_{j'})} \quad \forall j' \in U \quad (7)$$

The use of the $R \vee \hat{y}$ instead of the remainder R on the numerator of the cover allows to also detect highly overlapping objects as in the previous case (formula (6)) with a further relaxation.

In all three version of R-MP, at each iteration, after selecting the atom's index, the following parameters update:
  a. The recovered support set $\hat{\Lambda}$ which initially set to be empty.
  b. The recovered MSV $\hat{y}$, which is a Boolean vector constructed by bitwise OR among the so far recovered atoms of D, at a certain iteration. This vector initially set to be zero.
  c. The remainder R, which is a Boolean vector initially equivalent to the MSV y. At each iteration, this vector updates by taking out the contribution of the so far recovered MSV ŷ, from the original one y. After each iteration the energy of the remainder, i.e. the Hamming weight of the vector R, reduces.

d. The error level e, that is a scalar set to be the Hamming weight (energy) of the MSV y. This value updates at each step by counting the number of bits in the recovered MSV j) that are mismatching with the original MSV ŷ. At the beginning of the iterations, the error decreases, however by recovering too many atoms, at a certain point, this value starts to increase.

e. A scalar value t counts the number of the objects/people so far has been recovered.

The stopping or ending criteria for the iterative process are closely related to the extra side-information and hence it is different for each of the three versions of R-MP. It appears in the criterion in the while loop of the Main Greedy Process and for each version is as follows:

a. For the first R-MP version that optimizes (2), the Main Greedy Process runs only for k iterations which is equivalent to selecting k atoms of D, i.e. estimating only k object/persons.

b. For the second R-MP version that optimizes (3), the iterations continue to add more atom indices to $\hat{\Lambda}$, as long as the error level e is higher than the noise level $\epsilon$. As soon as e falls below the noise level, the iterations stop. This avoids recovering too many more atoms that actually would start representing the noisy parts rather than the true objects' silhouettes.

c. For the third R-MP version that optimizes (4), the iterations continue to add more atom indices to $\hat{\Lambda}$, as long as the error level e is decreasing fast enough. More precisely, the error between two consecutive steps must decrease with a difference of more than $\alpha$. The rational behind, as mentioned before, is that the error value at the beginning of the iterations starts to decrease very fast. However, after recovering the true objects, at a certain point, the algorithm starts to recover the noisy part of the MSV that results in increasing the error level. It is assumed the noise is not adversarial, and it cannot be modeled (fitted) by atoms that are designed to estimate the true objects'/peoples' silhouettes. That explains why an attempt to model/recover the noisy parts leads to an increase in the error level which force the iterations stopping. The parameter $\alpha$ that weights two terms of (4) appears to be the required limit for the error's decreasing speed, in order to continuing the iterations.

The algorithm allows to retrieve the occupancy vector in real-time. Moreover, R-MP is robust to the occlusions, since is able to detect/localize objects or people even if they occlude each other, as FIGS. 1 and 2 demonstrates.

In one embodiment the algorithm can be used for tracking objects. In this case, the occupancy vector x retrieved for a frame can be used in the next frame as another observation vector in conjunction with the current frame's MSV y. In this case, the inter-frames correlations are advantageously exploited to improve tracking.

In another embodiment the algorithm can take into account radio signals emitted from the objects or people in order to retrieve efficiently their positions.

In another embodiment the output of the algorithm according to the invention is not a vector comprising points on the 2-D ground, but 3-D volumes. The algorithm then can determine 3-dimensional positions. In such a case, the system is able to determine for example the position of a basket player just as he is jumping. In this embodiment many cameras 2 are needed. Moreover, the calibration step has to be 3-dimensional.

If objects to be detected are people, the shape of atoms that gives a high precision for retrieving the positions is half rectangular and half ellipsoid. Other shapes, i.e. a rectangular shape or an ellipsoid shape, can be used, whereas the optimal shape also depends on the inclination of cameras. Between two occupied ground points, the minimal spatial distance is representative of the average width of a standing person. A typical value is between 60 cm and 70 cm. The sensitivity of R-MP to the model that generates the human silhouettes, in the case of a half rectangular and half ellipsoid shape, is 30%. In other word R-MP can use the same dictionary design in order to robustly detect/localize people in the range of 1.20 m till 2.20 m if atoms of the dictionary D are designed so that they approximate silhouettes of people with height 1.70 m. Hence, the proposed approximate shape for atoms can handle 30% mismatch, i.e. the tolerance is equal to 30%.

If many cameras 2 are used, the dimensions of y and x, and consequently of D, increase. In this case some possibilities exist in order to further reduce the complexity cost, i.e. the total computational time and the memory storage.

In one embodiment the dimensionality of the observations can be reduced. The dimension of the observation vector y is by default equal to the sum of each camera resolution. To reduce the computation cost, all images are down scaled.

The complexity cost depends on N the number of ground plane points to locate as occupied or not. In another embodiment the resolution of the cameras and the sparsity of the people present in the scene are considered for discretizing the ground. According to one aspect of the invention a non-regularly spaced sampling process is used for discretizing the ground.

Figure 6A:
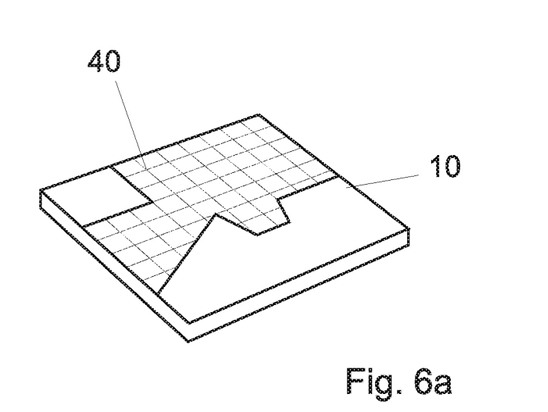
FIG. 6a shows sample points given a regularly spaced grid (prior art).
Figure 6B:
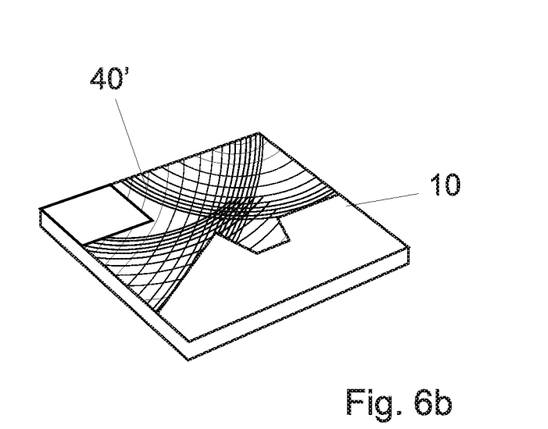
FIG. 6b shows sample points given a non-regular grid according to the invention.

Known solutions are known for discretizing the visible part of the ground into a fixed number of points regularly spaced as shown in FIG. 6a. FIG. 6b shows the non-regularly spaced sampling process. Points regularly spaced in the image plane of all cameras are mapped to the ground to form points called the "sample points". The mapped location points are quantized to avoid points spaced with less than few centimeters. Although the grid proposed in FIG. 6b has less number of points, regions of interest have higher density of points, i.e. higher spatial resolution compared to the known solution of FIG. 6a.

In another embodiment a further reduction in the search space can be achieved by measuring the activity of a sample point according to three possible assumptions:

1. Assumption 1 (Foreground pixels only): Sample points are ground plane points belonging to the foreground pixels of at least one camera.
2. Assumption 2 (Intersecting foreground pixels): Sample points are ground plane points belonging to the foreground pixels of all the cameras observing the corresponding points.
3. Assumption 3 (Least significant silhouette): Sample points are ground plane points corresponding to a significant foreground silhouette in all the cameras observing the corresponding points.

The assumption 3 is contained in the assumption 2 that is contained in the assumption 1. In other words, the assumption 3 is more restrictive than assumption 2 and the assumption 2 is more restrictive than assumption 1. When an assumption reduces the search space, it may have the counter part of potentially removing correct locations.

Figure 7A:
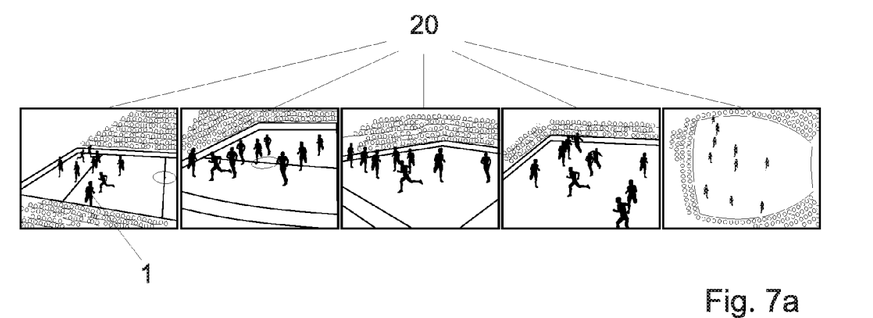
FIG. 7a shows an example of five views of cameras with overlapping field-of-views.
Figure 7B:
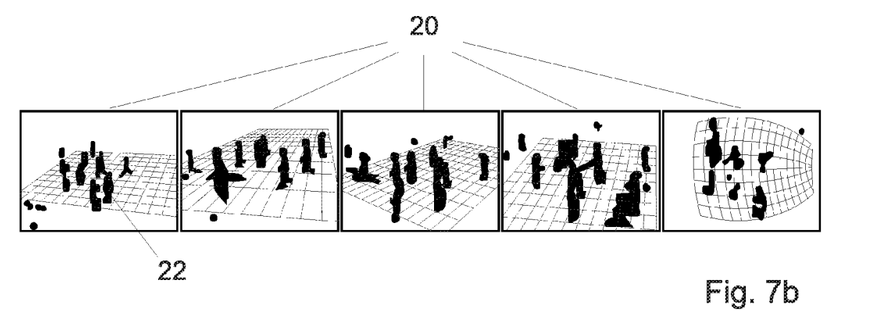
FIG. 7b shows the corresponding degraded silhouettes. The grid is only for visual purposes.
Figure 7C:
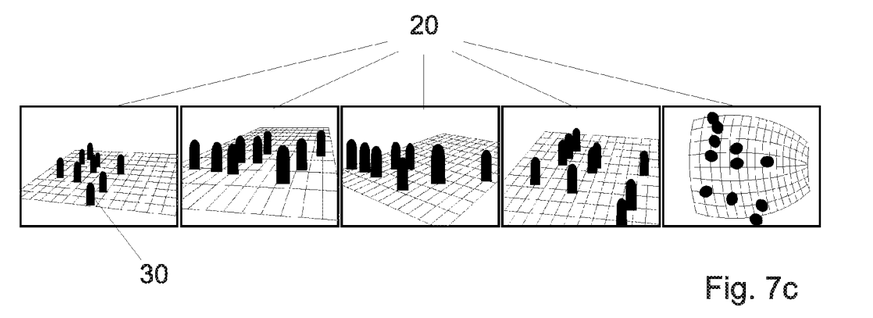
FIG. 7c shows atoms modeling the given foreground silhouettes. The grid is only for visual purposes.

FIG. 7a shows an example of five views of cameras with overlapping field-of-views. FIG. 7b illustrates an example of foreground silhouettes (made of shadows, people's reflection, missed regions) and FIG. 7c shows the silhouettes used to model their presence in the set of planar and omnidirectional cameras.

The invention claimed is:

1. A method for automatic localization of objects in a mask, comprising the steps of:
   building a dictionary of atoms, wherein each atom models the presence of one object at one location;
   iteratively selecting a most correlated atom of said dictionary of atoms with a multi-silhouette vector for each possible location;
   iteratively updating a remainder of said multi-silhouette vector taking out the contribution of said most correlated atom; and
   repeating the steps of selecting and updating until meeting ending criteria, wherein said most correlated atom corresponds to a maximal statistic;
   further comprising:
   a. acquiring a multi-silhouette vector y;
   b. defining an upper-bound on the number of the objects $W_H(x) \leq k$;
   c. defining a regularization factor $\lambda$;
   d. defining a dictionary D;
   e. creating an output support set $\hat{\Lambda}$;
   f. initializing $\hat{\Lambda}=\{\}, U=\{\}, R \Leftarrow y, \hat{y} \Leftarrow 0, e \Leftarrow W_H(y), t \Leftarrow 1;$ g. performing a preprocessing step for reducing the search space to a set $U \subset \{1, 2, \ldots, N\}$;
   h. computing the sequence of statistics according to the formula $$\lambda \frac{W_H(d_{j'} \wedge R)}{W_H(d_{j'})} + (1-\lambda) \frac{W_H(d_{j'} \wedge R)}{W_H(R)} \quad j' \in U$$

wherein $d_{j'}$, are said atoms, R is said remainder, $\wedge$ is bitwise AND operator, $W_H(.)$ is the Hamming weight of a Boolean vector and X is a regularization factor;
   i. repeating the step h. for each point between the number of points on the search space;
   l. finding the argmax of said sequence of statistics;
   m. updating said output support set according to the formula $\hat{\Lambda} \Leftarrow \hat{\Lambda} \cup \{j\}$;
   n. updating said recovered multi-silhouette vector according to the formula $\hat{y} \Leftarrow \hat{y} \vee d_{j'}$, where $d_{j'}$ is the atom corresponding to said argmax of said sequence of statistics;
   o. updating said remainder according to the formula $R \Leftarrow R \wedge (\neg \hat{y})$ wherein $\neg$ is the bitwise NOT operator;
   p. updating an error according to the formula $e \Leftarrow (\hat{y} \oplus y)$, wherein $\oplus$ is the bitwise XOR operation between vectors;
   q. updating a counter according to the formula $t \Leftarrow t+1$; and
   r. repeating steps h. to q. until $t \leq k$.

2. The method of claim 1, wherein said mask is computed by a foreground-background extraction process from an image acquired by at least one camera, and wherein each step comprises the determination of the atom which is most correlated with said mask, and the adaptation of a remainder by taking out said atom.

3. The method of claim 1, wherein each atom models the different images taken by a plurality of different cameras of one object at one location.

4. The method of claim 1 wherein said ending criteria depends on an a priori knowledge of the number of objects to be detected.

5. The method of claim 1 wherein said atoms in said dictionary depend on the shape of said objects.

6. The method of claim 1 wherein said dictionary depends on the position, the zoom, the focus and the resolution of said at least one camera.

7. The method of claim 1 wherein said location is defined by an adaptive discretization of a ground.

8. The method of claim 7 wherein said adaptive discretization comprises the mapping of points regularly spaced in an image plane of said at least one camera to samples points of said ground and a quantization of said samples points on said ground.

9. The method of claim 8 wherein said dictionary is a matrix wherein the number of rows corresponds to the resolution of said at least one camera and the number of columns corresponds to the number of said samples points multiplied by the number of possible shapes of said atoms.

10. A method for automatic localization of objects in a mask, comprising the steps of:
    building a dictionary of atoms, wherein each atom models the presence of one object at one location;
    iteratively selecting a most correlated atom of said dictionary of atoms with a multi-silhouette vector for each possible location;
    iteratively updating a remainder of said multi-silhouette vector taking out the contribution of said most correlated atom; and
    repeating the steps of selecting and updating until meeting ending criteria, wherein said most correlated atom corresponds to a maximal statistic;
    further comprising:
    a. acquiring a multi-silhouette vector y;
    b. defining an upper-bound on the number of the objects $W_H(x) \leq e$;
    c. defining a regularization factor $\lambda$;
    d. defining a dictionary D;
    e. creating an output support set $\hat{\Lambda}$;
    f. initializing $\hat{\Lambda}=\{\}, U=\{\}, R \Leftarrow y, \hat{y} \Leftarrow 0, e \Leftarrow W_H(y), t \Leftarrow 1$ g. performing a preprocessing step for reducing the search space to a set $U \subset \{1, 2, \ldots, N\};$ h. computing the sequence of statistics according to the formula $$\lambda \frac{W_H(d_{j'} \wedge R)}{W_H(d_{j'})} + (1-\lambda) \frac{W_H(d_{j'} \wedge R)}{W_H(R)} \quad j' \in U;$$

wherein $d_{j'}$, are said atoms, R is said remainder, $\wedge$ is bitwise AND operator, $W_H(.)$ is the Hamming weight of a Boolean vector and I is a regularization factor;
    i. repeating the step h. for each point between the number of points on the search space;
    l. finding the argmax of said sequence of statistics;
    m. updating said output support set according to the formula $\hat{\Lambda} \Leftarrow \hat{\Lambda} \cup \{j\}$;
    n. updating said recovered multi-silhouette vector according to the formula $\hat{y} \Leftarrow \hat{y} \vee d_{j'}$, where $d_{j'}$ is the atom corresponding to said argmax of said sequence of statistics;

o. updating said remainder according to the formula $R \Leftarrow R_\wedge (\neg \hat{y})$ wherein $\neg$ is the bitwise NOT operator;

p. updating an error according to the formula $e \Leftarrow W_H(\hat{y} \oplus y)$, wherein $\oplus$ is the bitwise XOR operation between vectors;

q. updating a counter according to the formula $t \Leftarrow t+1$, and r. repeating steps h. to q. until $e \leq \epsilon$.

11. A method for automatic localization of objects in a mask, comprising the steps of:

building a dictionary of atoms, wherein each atom models the presence of one object at one location;

iteratively selecting a most correlated atom of said dictionary of atoms with a multi-silhouette vector for each possible location;

iteratively updating a remainder of said multi-silhouette vector taking out the contribution of said most correlated atom; and repeating the steps of selecting and updating until meeting ending criteria, wherein said most correlated atom corresponds to a maximal statistic;

further comprising:

a. acquiring a multi-silhouette vector y;

b. defining an upper-bound on the number of the objects $W_H(x) \leq e$;

c. defining a regularization factor $\lambda$;

d. defining a dictionary D;

e. creating an output support set $\hat{\Lambda}$;

f. initializing $$\hat{\Lambda} = \{\}, U = \{\}, R \Leftarrow y, \hat{y} \Leftarrow 0, e \Leftarrow W_H(y), t \Leftarrow 1;$$

g. performing a preprocessing step for reducing the search space to a set $$U \subset \{1, 2, \ldots, N\};$$

h. computing the sequence of statistics according to the formula $$\lambda \frac{W_H(d_{j'} \wedge R)}{W_H(d_{j'})} + (1-\lambda) \frac{W_H(d_{j'} \wedge R)}{W_H(R)} \quad j' \in U;$$

wherein $d_{j'}$ are said atoms, R is said remainder, $\wedge$ is bitwise AND operator, $W_H(.)$ is the Hamming weight of a Boolean vector and $I$ is a regularization factor;

i. repeating the step h. for each point between the number of points on the search space;

l. finding the argmax of said sequence of statistics;

m. updating said output support set according to the formula $\hat{\Lambda} \Leftarrow \hat{\Lambda} \circ \{j\}$;

n. updating said recovered multi-silhouette vector according to the formula $\hat{y} \Leftarrow \hat{y} \vee d_{j'}$, where $d_{j'}$ is the atom corresponding to said argmax of said sequence of statistics;

o. updating said remainder according to the formula $R \Leftarrow R_\wedge (\neg \hat{y})$ wherein $\neg$ is the bitwise NOT operator;

p. updating an error according to the formula $e \Leftarrow W_H(\hat{y} \oplus y)$, wherein $\oplus$ is the bitwise XOR operation between vectors;

q. updating a counter according to the formula $t = t+1$;

r. repeating steps h. to q. until $e - e \geq \alpha$.

12. A non-transitory computer readable medium storing a program causing a computer to execute instructions executable to compute the method of claim 1.

13. The method of claim 10, wherein said mask is computed by a foreground-background extraction process from an image acquired by at least one camera, and wherein each step comprises the determination of the atom which is most correlated with said mask, and the adaptation of a remainder by taking out said atom.

14. The method of claim 10, wherein each atom models the different images taken by a plurality of different cameras of one object at one location.

15. The method of claim 10, wherein said ending criteria depends on an upper bound error level of the energy level of said remainder.

16. The method of claim 10, wherein said atoms in said dictionary depend on the shape of said objects.

17. The method of claim 10, wherein said dictionary depends on the position, the zoom, the focus and the resolution of said at least one camera.

18. The method of claim 10 wherein said location is defined by an adaptive discretization of a ground.

19. The method of claim 18 wherein said adaptive discretization comprises the mapping of points regularly spaced in an image plane of said at least one camera to samples points of said ground and a quantization of said samples points on said ground.

20. The method of claim 19, wherein said dictionary is a matrix wherein the number of rows corresponds to the resolution of said at least one camera and the number of columns corresponds to the number of said samples points multiplied by the number of possible shapes of said atoms.

21. The method of claim 11, wherein said mask is computed by a foreground-background extraction process from an image acquired by at least one camera, and wherein each step comprises the determination of the atom which is most correlated with said mask, and the adaptation of a remainder by taking out said atom.

22. The method of claim 11, wherein each atom models the different images taken by a plurality of different cameras of one object at one location.

23. The method of claim 11, wherein said ending criteria depend on the decreasing of an error level e.

24. The method of claim 11, wherein said atoms in said dictionary depend on the shape of said objects.

25. The method of claim 11, wherein said dictionary depends on the position, the zoom, the focus and the resolution of said at least one camera.

26. The method of claim 11 wherein said location is defined by an adaptive discretization of a ground.

27. The method of claim 26 wherein said adaptive discretization comprises the mapping of points regularly spaced in an image plane of said at least one camera to samples points of said ground and a quantization of said samples points on said ground.

28. The method of claim 27, wherein said dictionary is a matrix wherein the number of rows corresponds to the resolution of said at least one camera and the number of columns corresponds to the number of said samples points multiplied by the number of possible shapes of said atoms.

29. A non-transitory computer readable medium storing a program causing a computer to execute instructions executable to compute the method of claim 10.

30. A non-transitory computer readable medium storing a program causing a computer to execute instructions executable to compute the method of claim 11.

* * * * *